(12) United States Patent
Reinis et al.

(10) Patent No.: US 10,697,908 B2
(45) Date of Patent: Jun. 30, 2020

(54) METROLOGY INSPECTION APPARATUS

(71) Applicant: XWINSYS LTD., Migdal Haemek (IL)

(72) Inventors: Doron Reinis, Givat Ela (IL); Michael Geffen, Gilon (IL); Roni Peretz, Haifa (IL); Colin Smith, Amikam (IL)

(73) Assignee: XWINSYS LTD., Migdal Haemek (IL)

( * ) Notice: Subject to any disclaimer, the term of this patent is extended or adjusted under 35 U.S.C. 154(b) by 205 days.

(21) Appl. No.: 15/574,174

(22) PCT Filed: May 29, 2016

(86) PCT No.: PCT/IL2016/050555
§ 371 (c)(1),
(2) Date: Nov. 15, 2017

(87) PCT Pub. No.: WO2016/193968
PCT Pub. Date: Dec. 8, 2016

(65) Prior Publication Data
US 2018/0128757 A1 May 10, 2018

Related U.S. Application Data (60) Provisional application No. 62/169,018, filed on Jun. 1, 2015.

(51) Int. Cl.
*G01N 23/223* (2006.01)
*G01N 23/2206* (2018.01)
(Continued)

(52) U.S. Cl.
CPC ....... *G01N 23/223* (2013.01); *G01N 23/2076* (2013.01); *G01N 23/2206* (2013.01);
(Continued)

(58) Field of Classification Search
None
See application file for complete search history.

(56) References Cited

U.S. PATENT DOCUMENTS

5,177,774 A * 1/1993 Suckewer ................ G21K 7/00
378/43
6,381,303 B1 * 4/2002 Vu .......................... G01N 23/20
378/46
(Continued)

*Primary Examiner* — Hoon K Song
(74) *Attorney, Agent, or Firm* — Law Offices of Steven W. Weinrieb (57) ABSTRACT

The present disclosure provides a method and an apparatus for apparatus for inspecting a semiconductor wafer for abnormalities by accurately measuring elemental concentration at a target area. The apparatus includes an x-ray imaging subsystem for measuring an elemental composition at the target area of the semiconductor wafer. The apparatus further includes an edxrf subsystem for measuring an elemental concentration at the target area of the semiconductor wafer. The elemental concentration may be calibrated by first correlating the elemental concentration measurements obtained using x-ray imaging system for the target area with the elemental concentration measurements obtained using the edxrf subsystem for the target area to receive an augmented and accurate elemental concentration measurement for the target area of the semiconductor wafer.

15 Claims, 7 Drawing Sheets

(51) Int. Cl.
*G01N 23/207* (2018.01)
*G02B 21/00* (2006.01)

(52) U.S. Cl.
CPC ... *G02B 21/0004* (2013.01); *G01N 2223/076* (2013.01); *G01N 2223/6116* (2013.01)

(56) References Cited

U.S. PATENT DOCUMENTS

| | | |
|---|---|---|
| 2010/0111251 A1 | 5/2010 | Yellepeddi et al. |
| 2012/0294418 A1 | 11/2012 | Yellepeddi et al. |
| 2014/0072095 A1* | 3/2014 | Feser .............. G01N 23/2206 378/4 |
| 2014/0286473 A1 | 9/2014 | Tokar et al. |
| 2015/0032398 A1 | 1/2015 | Peterlinz et al. |

* cited by examiner

FIG. 7 ated patent application Ser. 62/169,018 filed on Jun. 1, 2015.
METROLOGY INSPECTION APPARATUS

RELATED APPLICATIONS

The present patent application claims priority to the previously filed and provisional patent application Ser. 62/169,018 filed on Jun. 1, 2015.

TECHNICAL FIELD

The present disclosure generally relates to a metrology apparatus for a semiconductor wafer; and more particularly relates to a metrology apparatus for accurately measuring and calibrating elemental concentration of a semiconductor wafer.

BACKGROUND

Semiconductor devices such as memory devices incorporating three-dimensional structures are generally formed of extremely well defined and repetitive structures applied onto a base wafer. The process of manufacturing the semiconductor devices includes a number of processing steps such as for example lithography, for the fabrication of the structures, patterns, etc. onto the base wafer. In the current scenario, to improve the yields, the designs, patterns, structures have to be reduced to very small sizes of around sub-micron levels. Accordingly, any defect in the process or patterns fabricated may hamper the yield and quality of the semiconductor devices. Therefore, In order to maintain high manufacturing yield and thus low manufacturing costs, these semiconductor devices have to be analyzed for abnormalities and anomalies. The industry roadmap has identified a lack of suitable inspection tools that are able to perform geometrical and compositional analysis of 3D micron and sub-micron scale features. Conventional techniques have shortcomings including less than desirable speed and accuracy. With respect to identifying defects in the manufacturing process, manual classification has been required of anomalies and manual diagnosing of the cause of defects. Such manual inputs may have resulted in inconsistent results and consumption of considerable operator time.

Recently, the focus has been shifted to EDXRF based metrology techniques for analyzing the three dimensional semiconductor devices for abnormalities and anomalies. ED-XRF is a reliable, sensitive and widely used technique for the detection and quantification of elemental concentrations within a sample semiconductor device.

To analyze very small size semiconductor devices, Micro-ED-XRF techniques have been used which are capable of analyzing elemental composition and concentrations for features with lateral resolution in the range of tens of microns down to single digit microns for a wide range of elements as designated in the periodical table. However, these micro-edxrf based techniques and systems are not subtle enough to accurately detect the anomalies, because these techniques are limited to a certain height or depth beyond which secondary emitted radiation is unable to reach the detectors due to obstruction by atomic interactions in their path.

Consequently, the inspection of these semiconductor devices having very small sized structures in range of sub-micron level cannot be done accurately using the EDXRF system alone.

Therefore, there is a need in art for simple and accurate systems that are able to accurately inspect the very small size features of these semiconductor devices.

SUMMARY

In one aspect of the present disclosure, a metrology apparatus for inspection of a semiconductor wafer having three dimensional structures, by using a combined application of x-ray imaging technology and edxrf technology. The apparatus includes an x-ray imaging subsystem to identify elemental composition measurement for a target area of the semiconductor wafer. The apparatus further includes an edxrf subsystem configured to identify elements and the elemental concentration measurement within the target area of the semiconductor wafer. The apparatus furthermore includes a controller configured to receive measurements from the x-ray imaging subsystem, and from the edxrf subsystem. The controller includes a processing unit configured to correlate and augment the elemental concentration within the target area of the semiconductor wafer by processing the measurements received from the x-ray imaging subsystem and the edxrf subsystem.

Further, the apparatus includes an optical microscope unit as a targeting unit for spotting the target area to be analyzed by the edxrf subsystem as well as the optical subsystem.

Possibly, the x-ray imaging subsystem includes a first x-ray source for irradiating the target area of the semiconductor wafer with a primary beam.

Further possibly, the x-ray imaging subsystem includes a scintillation detector for beam excited from the target area.

Yet further possibly, the scintillation type of detector produces an image of the target area of the semiconductor wafer, the image representing a first measurement data indicating the elemental concentration within the target area.

Generally, the edxrf subsystem includes a second x-ray source for irradiating the target area of the semiconductor wafer with a primary beam.

Further, the edxrf subsystem includes an X-ray detector for receiving fluorescence beam emitted from the target area.

Furthermore, the X-ray detector of the edxrf subsystem may detect a second measurement data indicating elemental concentration of the emitted fluorescence beams.

Optionally, a common x-ray source may be used as the first x-ray source as well as the second x-ray source.

Potentially, the three-dimensional optical microscope may be configured to measure a third measurement data indicating geometrical parameters such as critical dimensions, volume, thickness, depth etc. of the target area of the sample material.

Additionally, the apparatus may include a display unit for displaying the accurately measured elemental concentration information in the form of graphs, tables, etc.

In another aspect of the invention, the disclosure provides a method for inspection of a three-dimensional semiconductor wafer using the apparatus of the current disclosure. The method includes measuring elemental concentration at a target area of the semiconductor wafer using an x-ray imaging subsystem. The method further includes measuring elemental concentration at the target area of the semiconductor wafer using an edxrf subsystem. The method furthermore includes correlating the elemental concentration measurements obtained using the x-ray imaging subsystem with the elemental concentration information obtained using the edxrf subsystem to obtain an augmented elemental concentration for the target area of the semiconductor wafer.

Possibly, the method further comprises calculating volumetric information of the target area of the semiconductor wafer using a three dimensional optical microscope.

Further possibly, the method includes correlating the augmented elemental concentration measurements for the target area with the volumetric information for the target area to obtain a calibration data.

Yet further possibly, the method includes calibrating the augmented elemental concentration measurement for the target area using the obtained calibration data and the volumetric information received from optical microscope.

Potentially, the augmented elemental concentration is converted to a relative volumetric information before correlation with the volumetric information received from optical subsystem.

Further potentially, the correlation is done by generating a plot between the relative volumetric information and the volumetric measurement using a correlation algorithm.

Yet further potentially, the correlation algorithm used is Pearson correlation algorithm.

The details of one or more implementations are set forth in the accompanying drawings and the description below. Other aspects, features and advantages of the subject matter disclosed herein will be apparent from the description, the drawings, and the claims.

DETAILED DESCRIPTION

As required, a schematic, exemplary-only embodiment of the present application is disclosed herein; however, it is to be understood that the disclosed embodiment is merely exemplary of the present disclosure, which may be embodied in various and/or alternative forms. Specific structural and functional details disclosed herein are not to be interpreted as limiting, but merely as a basis for the claims and as a representative basis for teaching one skilled in the art to variously employ the present disclosure in virtually any appropriately detailed structure.

Aspects, advantages and/or other features of the exemplary embodiment of the disclosure will become apparent in view of the following detailed description, which discloses various non-limiting embodiments of the invention. In describing exemplary embodiments, specific terminology is employed for the sake of clarity. However, the embodiments are not intended to be limited to this specific terminology. It is to be understood that each specific portion includes all technical equivalents that operate in a similar manner to accomplish a similar purpose.

Exemplary embodiments may be adapted for many different purposes and are not intended to be limited to the specific exemplary purposes set forth herein. Those skilled in the art would be able to adapt the exemplary-only embodiment of the present disclosure, depending for example, on the intended use of adapted embodiment. Moreover, examples and limitations related therewith brought herein below are intended to be illustrative and not exclusive. Other limitations of the related art will become apparent to those of skill in the art upon a reading of the following specification and a study of the related figures.

The present application discloses a metrology apparatus for inspecting a semiconductor wafer having one or more three dimensional structures configured thereon. The apparatus may generally be used for detecting anomalies in semiconductor wafer by measuring elemental concentration of any sample semiconductor structure such as but not limited to FinFETs, three dimensional-dimensional structures such as nanowires, memory structures such as DRAM, DRAM 4F2, FLASH, MRAM, high aspect ratio memory structures and multilayer metals and/or isolators, three-dimensional structures well known in the art. It must also be noted that, as used in this specification and the appended claims, the singular forms "a," "an" and "the" include plural referents unless the context clearly dictates otherwise. Thus, for example, the term "a beam" is intended to mean a single ray or a combination of rays.

Figure 1:
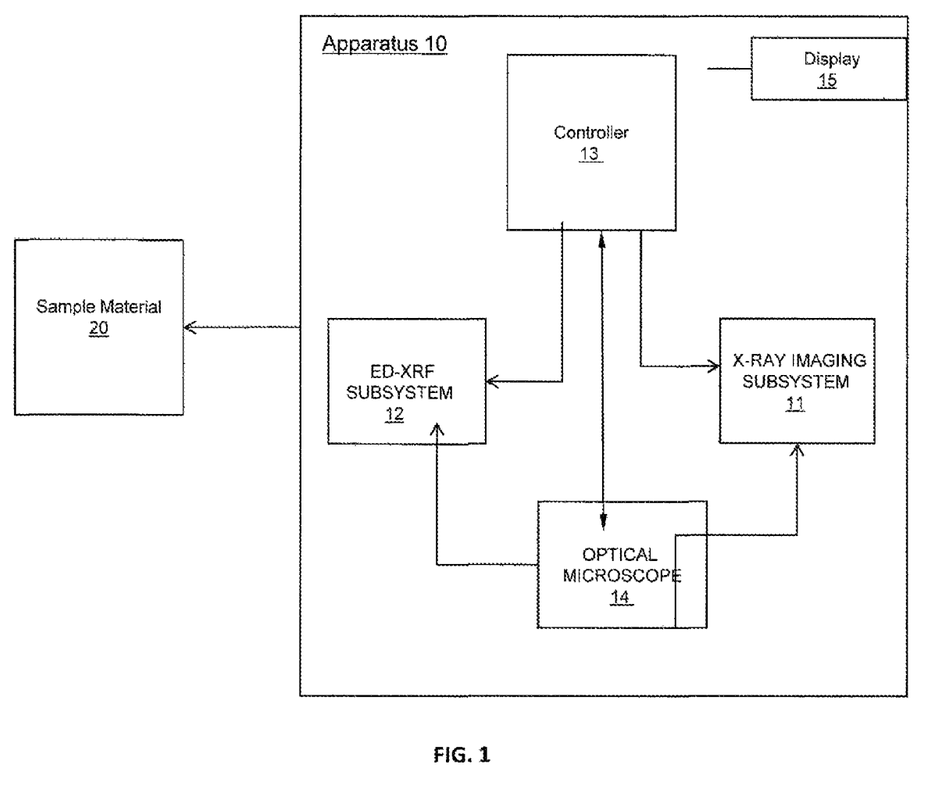
FIG. 1 is a block diagram representing a metrology apparatus, according to one preferred embodiment of the present disclosure.
Figure 2:
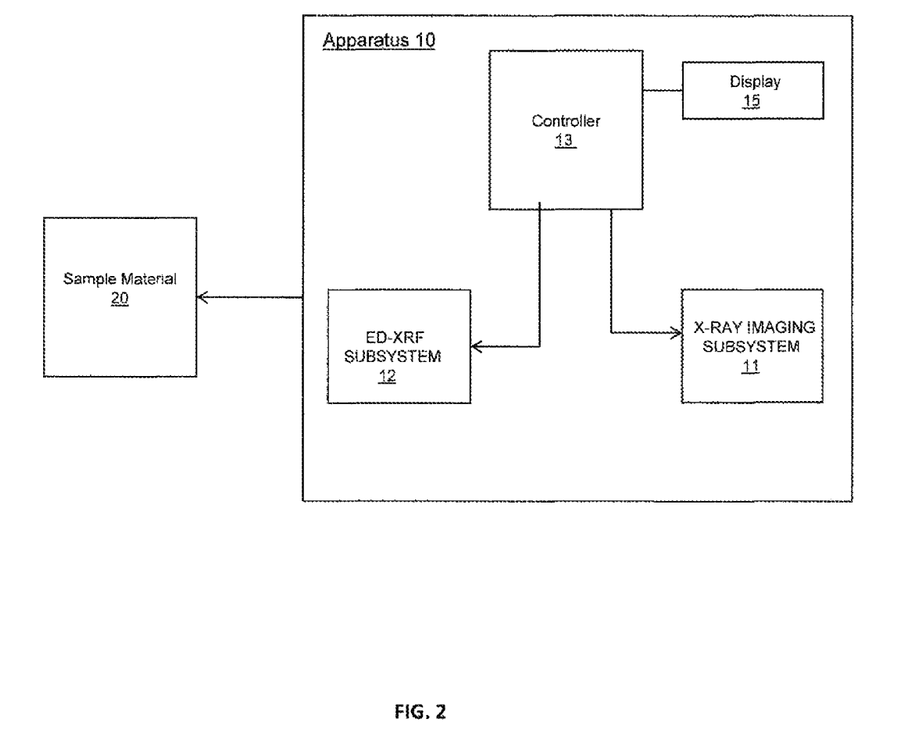
FIG. 2 is a block diagram representing a metrology apparatus, according to another embodiment of the present disclosure.

FIGS. 1-2 depict a block diagram displaying basic components of the apparatus of the present disclosure. In description of the FIGS. 1-2 that follows, elements common to the apparatus will have the same number designation unless otherwise noted. In a first embodiment, as illustrated in FIG. 1, the present invention provides an apparatus 10 for inspecting a three dimensional semiconductor wafer 20 by measuring an elemental concentration at a target area thereof. The apparatus 10 comprises an x-ray imaging subsystem 11 capable of imaging the target area of the semiconductor wafer 20 to provide a first measurement data indicating elemental composition of the target area. The apparatus 10 further comprises am edxrf subsystem 12 capable of analyzing an xrf spectrum and in turn identify a second measurement data indicative of elemental parameters such as elemental composition, and element concentration at the target area of the semiconductor wafer 20. Further; the apparatus 10 includes a controller 13 connected to, and configured to acquire the first measurement data from the x-ray imaging subsystem 11 and the second measurement data from the edxrf subsystem 12. The controller 13 is further configured to process at least in parts the first measurement data and the second measurement data to accurately correlate and augment the elemental concentration at the target area of the wafer 20.

In a modification of the first embodiment, as illustrated in FIG. 2, the apparatus 10 may further comprise a three dimensional optical microscope 14 for identifying a third measurement data indicative of geometric parameters such as pitch, critical dimension (CD), side wall angle (SWA), line width roughness (LWR), and line edge roughness (LER)) of the target area of the wafer 20. In such an embodiment, the controller 13 receives the third measurement data from the optical microscope to process and calibrate the augmented elemental concentration.

In some embodiments, the apparatus 10 may further include a display unit 15 operably connected to the controller unit 13 for displaying outputs such as XRF spectrum, elemental composition, and the calibrated elemental concentration.

Figure 3:
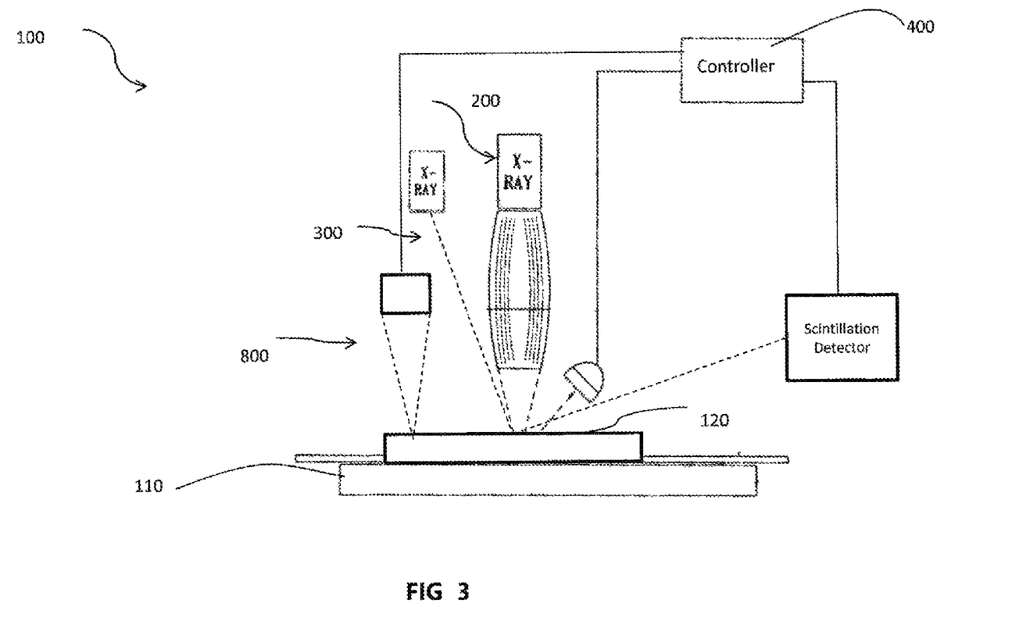
FIG. 3 is a schematic view of the metrology apparatus of FIG. 1, according to one preferred embodiment of the present disclosure.

FIG. 3 schematically show the arrangement of the basic components of the apparatus 10 of the present disclosure. However, in the construction of commercial functional units, secondary components such as wires, leads, couplers, connectors, support structure and other functional components known to one of skill in the field of metrology may be incorporated within the apparatus 10. Such commercial arrangements are included in the present invention as long as the structural components and arrangements disclosed herein are present.

Referring to FIG. 3, a metrology apparatus, generally represented by a numeral 100 for inspecting a generally three dimensional semiconductor wafer 120, is illustrated in accordance with an embodiment of the present disclosure. It should be understood that the wafer 120 may be of any type, shape and size, including the radius and height suitable according to its intended applications.

As shown in FIG. 3, the metrology apparatus 100 includes a platform 110 for holding the wafer 120. The platform 110 is generally a movable platform, such as an X-Y stage, so as to enable the wafer to be moved with respect to the X-ray beam. Alternatively, the platform 110 may be a suitable stationary fixture on which the wafer 120 may be held. The apparatus 100 further comprises an x-ray imaging subsystem 200, and an edxrf subsystem 300, connected to a controller unit 400. The apparatus 100 may further include an optical microscope 800 as a targeting unit for spotting the target area of the semiconductor wafer 120.

Figure 4:
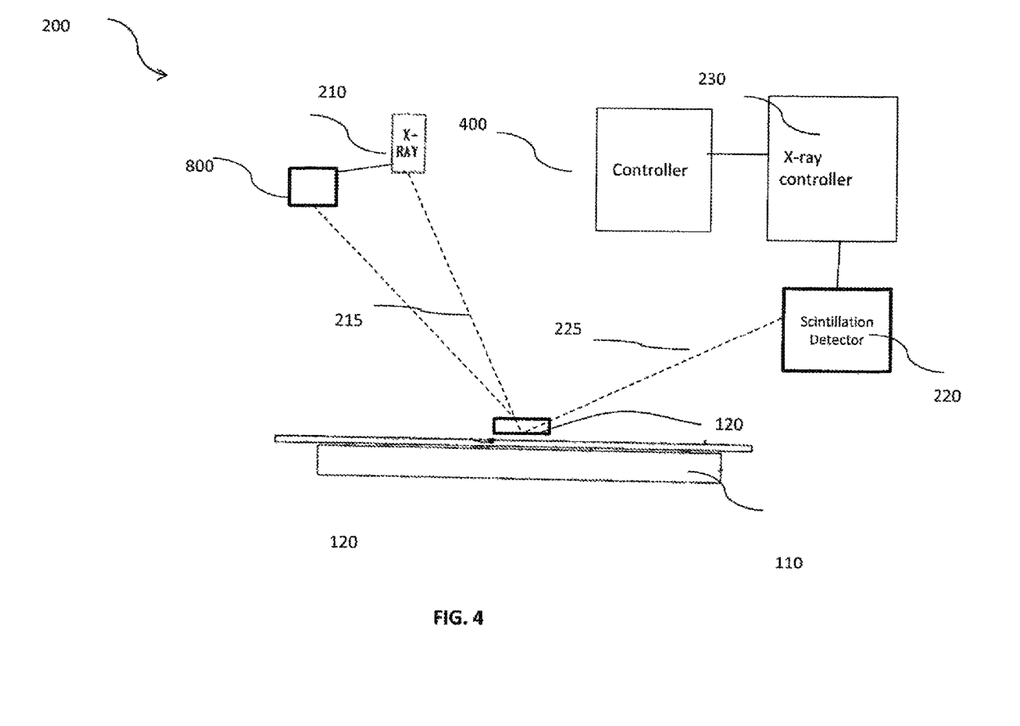
FIG. 4 is a schematic view of the x-ray imaging subsystem, according to an embodiment of the present disclosure.

FIG. 4 is a symbolic diagram of the components of an X-ray imaging subsystem 200 adapted to measure a first measurement data including elemental composition and concentration at the target area of the wafer 120. The x-ray imaging subsystem, 200 includes a first x-ray source 210 that emits an x-ray beam 215. The first x-ray source 210 is preferably a laboratory based source such as a sealed tube, rotating-anode, or micro-focus x-ray source. In one example, the x-ray source 210 is a transmission x-ray sub-micron-focus source. The small spot size or source size allows for high resolution imaging. The x-ray imaging subsystem 200 further comprises a transmission detector 220. In an embodiment, the detector 220 is a scintillator kind of detector. As already known in the art, the first x-ray source 210 emits x-rays 215 that penetrate the semiconductor wafer 120. Then, the output beam of x-rays 225 are detected and recorded by the detector 220 to generate an image of the target area of the semiconductor wafer 120. The image is analyzed to provide a first measurement data indicating elemental composition and concentration within the target area of the semiconductor wafer 120. In an embodiment of the present invention, the image is analyzed by the controller 400. In another embodiment of the present invention, the x-ray imaging subsystem 200 may include an x-ray detector controller 230 for processing and analyzing the image received from the detector 220

Figure 5:
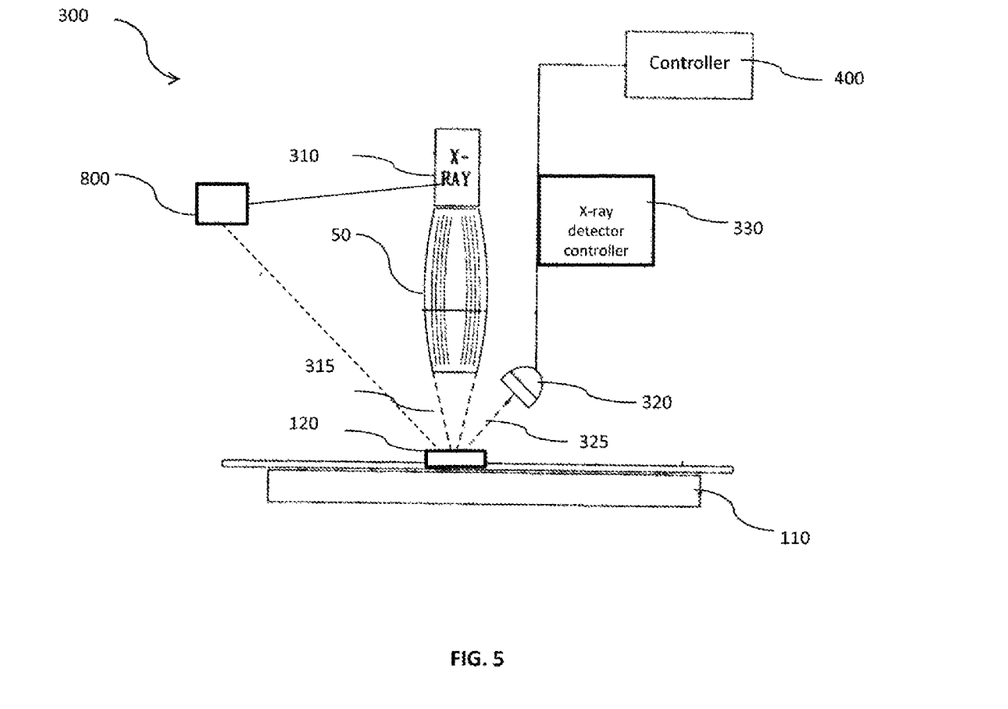
FIG. 5 is a schematic view of the edxrf subsystem, according to an embodiment of the present disclosure.

As illustrated in FIG. 5, the ED-XRF subsystem 300 includes a second x-ray source 310 for generating a primary incident beam 315 to enable excitation of atoms at a target area of the wafer 120. The second X-ray source 310 may take the form of any suitable x-ray tube or radioisotope source. As used herein, the term "x-ray" is broadly defined to include any radiation having energy suitable for causing fluorescence of the wafer 120 via ejection of an inner shell electron, and may encompass radiation classified as gamma-rays in other contexts.

The edxrf subsystem further includes an X-ray detector 320 positioned to receive secondary beam 325 emitted by the wafer 120. The emitted secondary beam 325 will typically comprise a mixture of fluorescent x-rays characteristic of specific elements present in the wafer 120 and elastically scattered (Rayleigh) and in-elastically scattered (Compton) x-rays. The design and operation of XRF detectors are well known in the art and hence will not be discussed herein. Generally described, the x-ray detector 320 resolves one or more x-ray photon energies from the detected secondary beam 325 and outputs a first measurement data comprising an electric signal for each x-ray energy component indicative of properties of the wafer 120. In some embodiments, the detector 320 may include an xrf detector controller 330 for processing the detected secondary beam 325. The detector 320 is generally an energy-dispersive x-ray spectroscopy (EDS) but in various implementations, the detector 320 may take the form from one of but not limited to a scintillation detector, ccd detector, or any other suitable type of x-ray fluorescence detector known to one skilled in the art As shown in FIG. 3, the apparatus may include an optical microscope 800 configured to measure a third measurement data comprising 3d geometric parameters such as height, depth, critical dimensions etc. Further, as shown in FIG. 5, the optical microscope 800 may also be used to spot, control and direct x-rays from the first x-ray source 210 and the second x-ray source 310 over a broad range of angles and energies thereby generating a small focused x-ray beam onto the target area of the semiconductor wafer 120. Accordingly, the optical microscope 800 precisely aligns the input x-ray beam from the x-ray imaging subsystem 200 and the edxrf subsystem 300 towards an identical line of sight of the target area of the semiconductor wafer 120.

The apparatus 100 of the present disclosure may further include a controller 400 as illustrated in FIG. 3. It may be understood that the controller 400 may be a computing device, including typical components like, a display unit, a central processing unit (CPU), random access memory (RAM), read-only memory (ROM), at least one stored program, display readouts, and at least one input unit. The controller 400 is connected to the x-ray imaging subsystem 200 and the edxrf subsystem 300 and the optical microscope 800 of the apparatus 100. In general, the controller 400 is adapted to receive the first measurement data from xrf imaging subsystem 200 and the second measurement data from the edxrf subsystem 300, and to accurately correlate measure and augment the elemental concentration based upon the inputs received. Typically, the processing unit of the controller 400 may include program instructions for acquisition and analysis of the measurement data received from the x-ray imaging subsystem 200 and the edxrf subsystem 300 and the optical subsystem 800, including implementations of the method steps depicted in FIG. 6 and FIG. 7 and discussed below.

The display unit is a visible portion of the control unit 400. The display unit preferably houses the display readouts, input module, CPU, RAM, and ROM, as well as any programs stored in the RAM or ROM. The display readouts preferably include a display screen such as a crystal display (LCD) panel, or the like to display outputs such as a "XRF Spectra", the "first measurement data", the second measurement data, and calibrated elemental concentration. In some embodiments, the controller may construct an energy spectrum of the calibrated measurements for element-specific estimates of concentrations present in the sample, identifying characteristic peaks of the XRF spectral datasets and may display onto the display unit.

The input module preferably includes a start inspection switch for starting inspection process using the apparatus 100. The input module may further include switches for controlling the operation x-ray imaging subsystem 200 and the edxrf subsystem 300 and the optical microscope 800. In an embodiment, x-ray imaging subsystem 200 and the edxrf subsystem 300 work simultaneously within the same time frame. In another embodiment, x-ray imaging subsystem 200 and the edxrf subsystem 300 work sequentially one after the other.

The CPU, RAM, ROM, and program act in concert to evaluate the inputs received and to control the calibration process. The CPU and RAM may be specially manufactured for this invention, or may preferably make us of off-the-shelf items available at the time of manufacture. The ROM may also be specially designed for this invention and may include program instructions. However, PROMs, EPROMs, EEPROMs or the like are preferred, which allow for selective programming, and may be arranged to be programmed even in the field. The RAM is preferably used to temporarily store operator and system inputs, but may also be used to store programming instructions supplemental to the program or programs stored in the ROM. Based on the programming instructions from the ROM or other memory source and the inputs received, the CPU sends outputs to the display panel, as well as to outputs that control various components of the apparatus 10.

Figure 6:
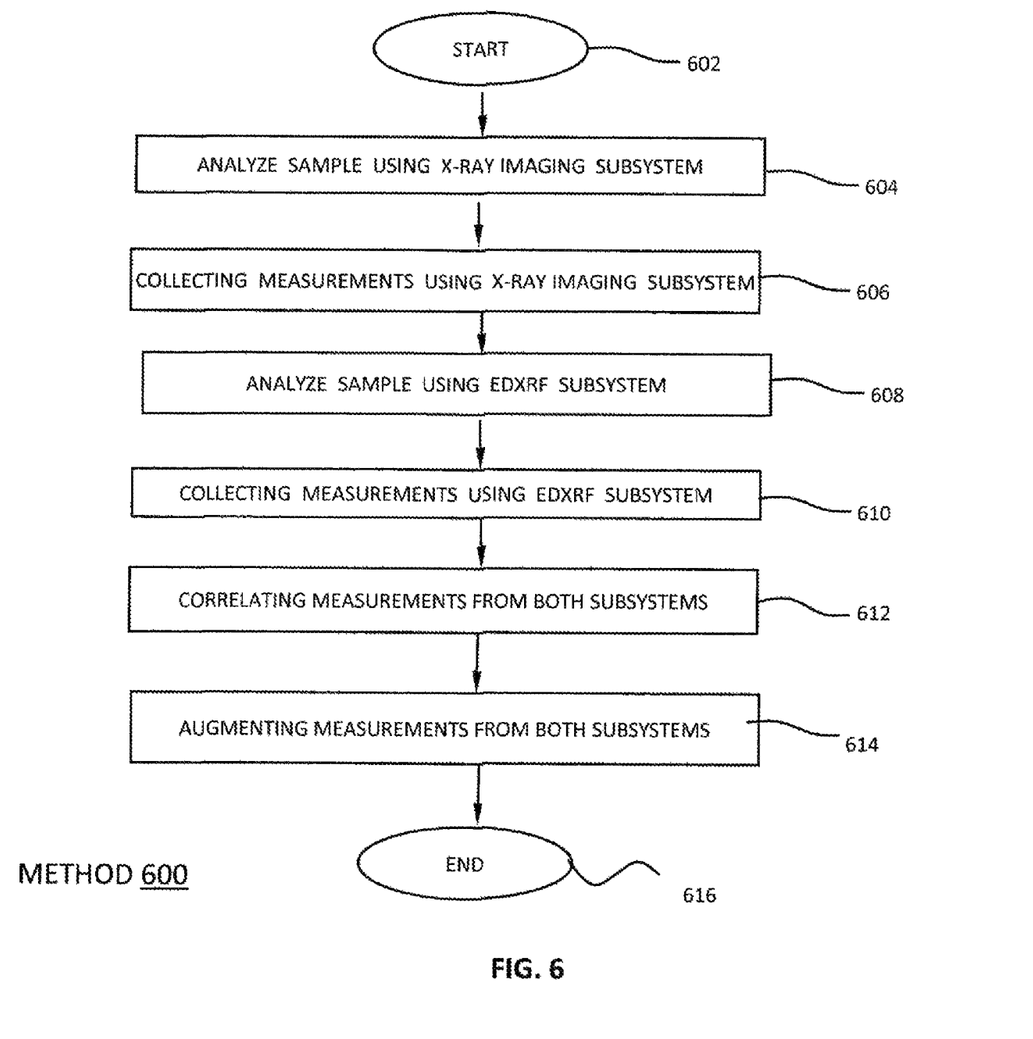
FIG. 6 is a flowchart illustrative of an exemplary method 600 for augmenting elemental concentration measurements within a target area, according to an embodiment of the present disclosure.

FIG. 6 with reference to FIGS. 1 through 5, represents a flow diagram depicting a method for inspection of a target area of a semiconductor wafer 120 using the apparatus 100. The semiconductor wafer 120 may be any three dimensional semiconductor structure having shape, size, thickness, depth and features as per the intended application thereof. The target area of the semiconductor wafer may be a feature, element, portion of the semiconductor wafer 120 where the inspection has to be performed. It is to be understood that while the method has been disclosed for a single target area of interest, it may be used to analyze any number of the target area of the semiconductor wafer 120. The method 600 starts at step 602, and proceeds to step 604 where a target area of a semiconductor wafer 120 to be inspected is analyzed using x-ray imaging subsystem 200 and a first measurement data comprising an image representing elemental composition at the target area of the semiconductor wafer is collected at step 606.

The method then proceeds to step 608 where the target area of the semiconductor wafer 120 is acted upon by the edxrf subsystem 300. As already well known in the art, the second x-ray source 310 emits a primary x-ray beam 315 towards a target area of the semiconductor wafer 120 thereby producing an excited secondary beam 325 of x-ray fluorescence, which is then collected by the x-ray detector 320. At step 610, the x-ray detector 320 resolves one or more x-ray photon energies from the detected secondary beam 325 and outputs a second measurement data comprising an electric signal for each x-ray energy component, indicative of properties of the target area of the wafer 120. The signal generally identifies the elemental characteristics such as elemental composition, elemental concentration, or the like of the excited secondary beam 325. The method then proceeds to step 612 where the first measurement data and second measurement data is received by the controller 400 which correlates the measurement data and outputs an augmented elemental concentration measurement for the target area of the semiconductor wafer 120 at step 614.

In an embodiment of the present invention, the steps 604 and the step 608 of the method 500 can be executed parallelly and simultaneously within the same time frame. In such an embodiment, the x-ray imaging subsystem 200 and the xrf subsystem 300 system 10 may simultaneously develop 3-D images as well as XRF elemental composition images. In such an embodiment, the x-rays beams of the reflected from the target area are captured and detected by the scintillator detector 220. The excited secondary fluorescence beam is detected by the xrf detector 320. The controller parallelly collects the measurement data from each of the subsystems 200, 300 and augments the measurement data to yield an accurate elemental concentration measurement for the target area of the semiconductor wafer 120.

In another embodiment, the steps 604 and the step 608 of the method 600 can be executed alternatively at different times from one another. For example, In such an embodiment, the x-ray imaging subsystem 200 is used to first analyze the semiconductor wafer 120 to determine a desired region of interest within the semiconductor wafer 120 by detecting anomalies using the first measurement data comprising an image of the semiconductor wafer 120. Thereafter, the edxrf subsystem 300 is used to analyze the desired regions of interest to determine the elemental concentration thereof.

Figure 7:
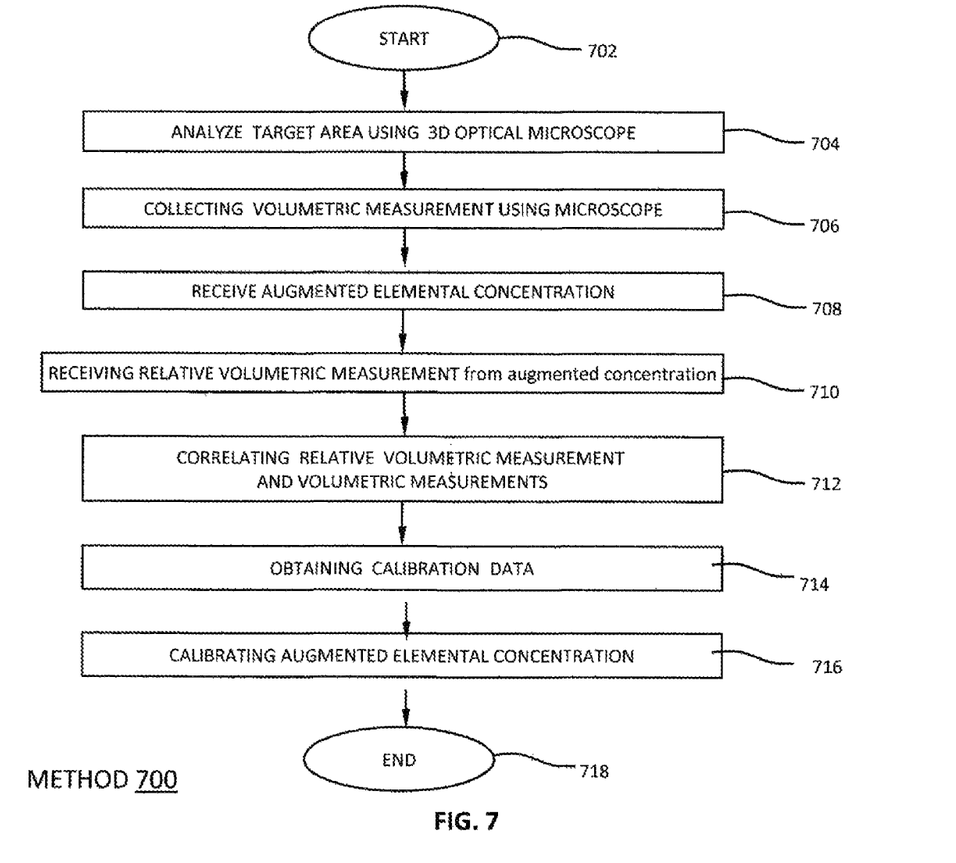
FIG. 7 is a flowchart illustrative of an exemplary method 700 for obtaining calibration of augmented elemental concentration using a three dimensional optical microscope, according to an embodiment of the present disclosure.

FIG. 7 with reference to FIGS. 1 through 6, represents a flow diagram for calibrating the augmented elemental concentration measurement received from the method 600 using the three dimensional microscope 50. The method starts at step 702 and proceeds to step 704 where a target area of the semiconductor wafer 120 is analyzed using the optical microscope 800 and a third measurement data comprising geometric parameter such as height, depth, critical dimension is collected to calculate an actual volumetric measurement value at step 706. The method 700 then proceeds to step 708 where the augmented elemental concentration is collected and converted to a relative volumetric measurement value on the basis of elemental concentration information (photon count information), as well known in the art at step 710. Thereafter, at step 712 the relative volumetric measurement value obtained from the step 710 is correlated with the volumetric measurement obtained from the step 706 by using a statistically fitting method. The statistically fitting correlation method can be any correlation method, currently known in the art such as the Pearson correlation algorithm. The correlation plot is then used at step 714 to obtain an elemental contrast as a function of volumetric disparity for the combined x-ray subsystems 200, 300 and the optical microscope 50. Such an elemental contrast is termed as calibration data.

The method 700 then proceeds to step 714 where calibration data is used to plot a graph between the augmented elemental concentration measurement obtained for the target area of the semiconductor wafer 120 against the volumetric measurement calculated for the target area of the semiconductor wafer 120 using the optical microscope 50, thereby obtaining a calibrated elemental concentration for the target area of the semiconductor wafer.

INDUSTRIAL APPLICABILITY

The present disclosure relates to a metrology apparatus 100 for inspecting a three dimensional semiconductor wafer for abnormalities and anomalies. The apparatus 100 could also be used for measuring accurate elemental concentration at a desired area or at a region of abnormalities by comparing the semiconductor wafer using the two subsystems 200 and 300 of the apparatus 100.

Throughout the specifications of the present disclosure, the term "comprising" means including but not necessarily to the exclusion of other elements or steps. In other words, the term comprising indicates an open list. Furthermore, all directional references (such as, but not limited to, upper, lower, inner, outer, upward, downward, inwards, outwards, right, left, rightward, leftward, inside, outside, top, bottom, above, below, vertical, horizontal, clockwise, and counter-clockwise, lineal, axial and/or radial, or any other directional and/or similar references) are only used for identification purposes to aid the reader's understanding of illustrative embodiments of the present disclosure, and may not create any limitations, particularly as to the position, orientation, or use unless specifically set forth in the claims. Moreover, all directional references are approximate and should not be interpreted as exact, but rather as describing a general indicator as to an approximate attitude.

Similarly, joinder references (such as, but not limited to, attached, coupled, connected, accommodated, and the like and their derivatives) are to be construed broadly and may include intermediate members between a connection of segments and relative movement between segments. As such, joinder references may not necessarily infer that two segments are directly connected and in fixed relation to each other.

In some instances, components are described with reference to "ends" having a particular characteristic and/or being connected with an-other part. However, those skilled in the art will recognize that the present disclosure is not limited to components which terminate immediately beyond their points of connection with other parts. Thus, the term "end" should be interpreted broadly, in a manner that includes areas adjacent, rearward, forward of, or otherwise near the terminus of a particular segment, link, component, part, member or the like. Additionally, all numerical terms, such as, but not limited to, "second", "second", "third", "fourth", or any other ordinary and/or numerical terms, should also be taken only as identifiers, to assist the reader's understanding of the various embodiments, variations and/or modifications of the present disclosure, and may not create any limitations, particularly as to the order, or preference, of any embodiment, variation and/or modification relative to, or over, another embodiment, variation and/or modification.

As will be readily apparent to those skilled in the art, the present invention may easily be produced in other specific forms without departing from its essential characteristics. The present embodiments is, therefore, to be considered as merely illustrative and not restrictive, the scope of the invention being indicated by the claims rather than the foregoing description, and all changes which come within therefore intended to be embraced therein. Many variations, modifications, additions, and improvements are possible. More generally, embodiments in accordance with the present disclosure have been described in the context of preferred embodiments. Functionalities may be separated or combined in procedures differently in various embodiments of the disclosure or described with different terminology. These and other variations, modifications, additions, and improvements may fall within the scope of the disclosure as defined in the appended claims.

The invention claimed is:

1. A metrology apparatus for inspecting a semiconductor wafer, comprising:
    an x-ray imaging subsystem for detecting elemental composition information;
    a three-dimensional optical microscope for detecting volumetric information;
    an edXRF subsystem for detecting elemental concentration information; and
    a controller in communication with said edXRF subsystem and said x-ray imaging subsystem,
    wherein said controller receives information from said edXRF subsystem and said x-ray imaging subsystem so as to accurately measure and augment said elemental concentration information; and
    wherein said controller receives volumetric information from said optical microscope so as to accurately calibrate said augmented elemental concentration information.

2. The apparatus of claim 1, wherein:
    said controller correlates said information from said edXRF subsystem and said X-ray imaging subsystem before augmenting said elemental concentration information.

3. The apparatus of claim 1, further comprising:
    a display screen in communication with said controller for displaying said elemental concentration of said semiconductor wafer.

4. The apparatus of claim 1, wherein:
    said controller converts said augmented elemental concentration information into relative volumetric information.

5. The apparatus of claim 4, wherein:
    said controller unit correlates said relative volumetric information with said volume information received from said optical microscope so as to obtain calibration data.

6. The system apparatus of claim 5, wherein:
    said calibration data comprises an elemental contrast as a function of volumetric disparity between said x-ray imaging subsystem and said optical microscope.

7. The system apparatus of claim 6, wherein:
    said controller uses said obtained calibration data to calibrate said augmented elemental concentration information.

8. The apparatus of claim 1, wherein:
    said optical microscope is further configured to spot and detect information of a target area of said semiconductor wafer; and
    wherein further, said optical microscope sends said spotted and detected information to said x-ray imaging subsystem and to said edXRF subsystem.

9. A method for inspecting a semiconductor wafer, comprising the steps of:
    analyzing and collecting elemental composition measurement values for a target area of said semiconductor wafer using an x-ray imaging subsystem;
    analyzing and collecting elemental concentration measurement values for said target area of said semiconductor wafer using an edXRF subsystem;
    correlating and augmenting said measurement values received from said x-ray imaging subsystem and said edXRF subsystem so as to receive accurate and augmented elemental concentration measurement values;
    analyzing and collecting a volumetric measurement value for said target area of said semiconductor wafer using said optical microscope;
    converting said augmented elemental concentration measurement values into relative volumetric measurement values;
    calculating calibration data by correlating said relative volumetric measurement values with said volumetric measurement values received from said optical microscope; and
    calibrating said augmented elemental concentration measurement values using said calculated calibration data.

10. The method according to claim 9, wherein:
said calibration data comprises an element contrast as a function of volumetric disparity between said measurement values of said x-ray subsystem and said optical microscope.

11. The method according to claim 9, further comprising the step of:
correlating relative volumetric information with volumetric information by generating a plot of said relative volumetric values versus said volumetric values.

12. The method according to claim 11, wherein:
said plot is generated by a statistical fitting process.

13. The method according to claim 12, wherein:
said statistical fitting process comprises a correlation algorithm.

14. The method according to claim 13, wherein:
said correlation algorithm used to generate said plot is a Pearson correlation algorithm.

15. The method according to claim 9, wherein:
calibrating said augmented elemental concentration measurement values comprises generating a plot of said augmented elemental concentration measurement values versus said volumetric measurement values collected using said optical microscope.

\* \* \* \* \*